(12) United States Patent
Noh (10) Patent No.: US 10,091,226 B2
(45) Date of Patent: Oct. 2, 2018

(54) METHOD AND APPARATUS FOR SERVICE TRAFFIC SECURITY USING DIMM CHANNEL DISTRIBUTION IN MULTICORE PROCESSING SYSTEM

(71) Applicant: WINS Co., Ltd., Seongnam-Si, Gyeonggi-do (KR)

(72) Inventor: Young Kook Noh, Seoul (KR)

(73) Assignee: WINS CO., LTD., Seongnam-Si (KR)

(*) Notice: Subject to any disclaimer, the term of this patent is extended or adjusted under 35 U.S.C. 154(b) by 164 days.

(21) Appl. No.: 15/157,410

(22) Filed: May 18, 2016

(65) Prior Publication Data

US 2016/0373475 A1    Dec. 22, 2016

(30) Foreign Application Priority Data

Jun. 16, 2015 (KR) .......................... 10-2015-0085119

(51) Int. Cl.
G06F 7/04 (2006.01)
H04L 29/06 (2006.01)
(Continued)

(52) U.S. Cl.
CPC .......... H04L 63/1425 (2013.01); G06F 3/067 (2013.01); G06F 3/0613 (2013.01);
(Continued)

(58) Field of Classification Search
CPC ..... H04L 63/1425; H04L 69/22; G06F 3/067; G06F 3/0653; G06F 3/0623; G06F 13/4282; G06F 13/4068; G06F 3/0613
See application file for complete search history.

(56) References Cited

U.S. PATENT DOCUMENTS

2011/0113191 A1* 5/2011 Pandya ............. G06F 17/30982
711/108
2016/0283283 A1* 9/2016 Jung .................... H04L 67/1004

FOREIGN PATENT DOCUMENTS

KR    10-2014-0098390 A    8/2014

OTHER PUBLICATIONS

Korean Patent Abstract (in English) of KR Pub. No. 1020140098390 A, Pub Date Aug. 8, 2014, download on Oct. 20, 2016, from http:/engpat.kipris.or.kr.

* cited by examiner

*Primary Examiner* — Mohammad W Reza
(74) *Attorney, Agent, or Firm* — Barcelo, Harrison & Walker, LLP (57) ABSTRACT

The present invention relates to a multicore communication processing service. More specifically, aspects of the present invention provide a technology for converting a plurality of data packet units into one jumbo frame unit, copying the converted jumbo frame to a plurality of dual in-line memories (DIMMs) by logical distribution, and computing the jumbo frame through each CPU including multicore processors corresponding to the plurality of DIMM channels, thereby reducing the number of packets per second and securing efficiency in memories and CPU resources, and also adding/removing a header field for each data packet included in the jumbo frame according to a path transmitted or received from a network interface card (NIC) of the jumbo frame or processing the data packet using the header field only, thereby minimizing packet receive event and reducing context switching generated upon the packet receive event, which results in improvement of jumbo frame processing performance.

10 Claims, 3 Drawing Sheets

(51) Int. Cl.
  *G06F 3/06* (2006.01)
  *G06F 13/40* (2006.01)
  *G06F 13/42* (2006.01)
(52) U.S. Cl.
  CPC .......... *G06F 3/0623* (2013.01); *G06F 3/0653* (2013.01); *G06F 13/4068* (2013.01); *G06F 13/4282* (2013.01); *H04L 69/22* (2013.01)

METHOD AND APPARATUS FOR SERVICE TRAFFIC SECURITY USING DIMM CHANNEL DISTRIBUTION IN MULTICORE PROCESSING SYSTEM

CROSS-REFERENCE TO RELATED APPLICATIONS

This application claims priority from Korean Patent Application No. 10-2015-0085119, filed on Jun. 16, 2015, in the Korean Intellectual Property Office. The entire contents of said application are incorporated herein by reference.

BACKGROUND OF THE DISCLOSURE

1. Technical Field

The present invention relates to multicore communication processing services.

2. Background Art

Internet speed rapidly increases by about 1000 times faster from 1 mega in the past to 1 giga at present due to explosive increases in the number of mobile users and Internet use. Also, hardware capable of supporting a 100 giga rate for network cards was also developed to keep up with the network speed. However, when compared with the current Internet speed in terms of a numerical value, the computer processing speed does not catch up with the network speed. Current CPUs with best specifications do not exceed four giga clock. Further, only parts thereof can be used by the configuration of a water-cooled cooler and artificial over-clocking, and with current technologies, it is impossible to maintain the operation of four giga in CPUs in a general way. Also, memories have evolved from DDR3 to DDR4, but memory clock speed increases from 1333 Mhz to 2900 Mhz, which is only twice faster than the conventional technology.

Due to limitations on physical techniques, it is impossible for computers to process such network speeds. Current computer development trends have physically evolved multiple physical CPU cores that can be installed in one CPU maximum into multiple cores, have improved or eliminated the bottle neck situation occurring among various devices connected to the CPU, or have improved performance by expanding the memory bandwidth from one memory channel to four channels, to increase the speed, not having developed the numerical value such as clock speed, due to limitation on physical techniques. However, with one computer, there is a limit to check abnormal packets in traffic in which network speed is 1000 times faster and the amount is much greater. In order for one computer to process traffic of 100 giga, it is necessary to design a specialized network card, efficient data processing between a multicore system and a network card, offloading such that the abnormal packet checking in a multicore system uses CPU computation less, and effective distribution of memory access in a security engine.

The slow-down of computer processing compared with network processing speed is because packet events received per second are identified, when the events are generated, context switch is generated in an operation system frequently, the events by the number of packets stop the computation currently being processed, and the packet computation requires much CPU computation. 10 giga generates 64 bytes 14 million packets received per second, and 100 giga generates 140 million packets received per second. When the locations of DIMM for storing packets received are not efficiently designated, it is difficult to process 100 giga traffic.

SUMMARY OF INVENTION

The present invention aims to provide a method and apparatus with improved efficiency for controlling resources, in a communication system for increasing efficiency of CPU resources necessary for operating a program by saving resources of CPU generated upon data packet processing.

Also, the present invention aims to provide a technology for reducing packet receive events and processing effective hardware distribution by distributing a jumbo frame and storing it in memories at physically different locations, since when CPU access is focused on one memory, the performance the one physical memory is capable of processing is limited even with a broad bandwidth.

According to an aspect of the present invention, the present invention includes producing a jumbo frame unit based on assigned resources, by combining a plurality of data packet units received from a port at a network interface card (NIC) controlling input and output of a data packet at a predetermined level based on a multicore platform, copying the produced jumbo frame unit to a plurality of dual in-line memory modules (DIMMs) by logical channel distribution through a peripheral component interconnect (PCI) interface part, grouping a plurality of DIMM channels for each CPU including a plurality of multicore processors in a host, and computing the jumbo frame received at each of the plurality of DIMM channels grouped from each CPU, checking predetermined items of the computed jumbo frame and analyzing whether to block a packet corresponding to the jumbo frame through a security engine part detecting an abnormal act, to indicate the analysis result in a header field of each packet, and extracting the corresponding header field for each packet of the jumbo frame and transferring the analysis result indicated based on a predetermined policy to the NIC through the PCI interface part, to process the packet based on the analysis result.

According to another aspect of the present invention, the present invention includes a network interface card (NIC) part controlling input and output of a data packet at a predetermined level based on a multicore platform, producing a jumbo frame unit based on assigned resources by combining a plurality of data packet units received from a port, and copying the produced jumbo frame unit to a plurality of dual in-line memory modules (DIMMs) in a host by logical channel distribution through a peripheral component interconnect (PCI) interface part, and a host grouping a plurality of DIMM channels for each CPU including a plurality of multicore processors, controlling the jumbo frame received at each of the plurality of DIMM channels grouped to be computed from each CPU, checking predetermined items of the computed jumbo frame and analyzing whether to block a packet corresponding to the jumbo frame through a security engine part detecting an abnormal act, indicating the analysis result in a header field of each packet, extracting the header field for each packet of the jumbo frame, and transferring the analysis result indicated based on a predetermined policy to the NIC part through the PCI interface part.

The present invention minimizes packet receive events, using hardware parallelism present in CPU including a plurality of multiple cores and batch processing technique based on a jumbo frame, capable of processing a plurality of data packets at once, thereby reducing context switching generated upon the packet receive event and improving the processing performance of the jumbo frame.

Also, the present invention converts n packet units into one jumbo frame unit, which allows to minimize 140 million packet receive events per second based on 64 byte to about 140 million/n, thereby reducing context switching generated upon the packet receive event and improving the processing performance of the jumbo frame.

Also, according to the present invention, a network card transfers the jumbo frame to memories at physically different locations, which allows a security engine to distributedly access multiple memories, thereby distributing into multiple channels and effectively using memory resources. Thus, it is possible to provide a network security service for 100 giga traffic. Also, the present invention is configured with 100 giga in-line constitution, capable of network security with one system, thereby achieving efficiency in costs and management.

DETAILED DESCRIPTION

Best Mode for Carrying Out the Invention

Hereinafter, preferred embodiments according to the present invention will be explained in detail with reference to the attached drawings. While specific details such as components are described in the following description, they are given to help comprehensive understanding of the present invention. Therefore, it is clearly to be understood by those skilled in the art that changes or modifications can be made to the present invention within the scope and spirit of the present invention.

The present invention relates to a multicore communication processing service. More specifically, the present invention relates to a technology for converting a plurality of data packet units into one jumbo frame unit, copying the converted jumbo frame to a plurality of dual in-line memories (DIMMs) by logical distribution, and computing through each CPU including multiple cores corresponding to the plurality of DIMM channels, thereby reducing the number of packets per second and securing efficiency in memories and CPU resources, and also adding/removing a header field for each data packet included in the jumbo frame according to a transmitting or receiving path from a network interface card (NIC) of the jumbo frame or processing the data packet using the header field only, thereby minimizing packet receive event and reducing context switching generated upon the packet receive event, which results in improvement of processing performance of the jumbo frame.

Hereinafter, a method for service traffic security using DIMM channel distribution in a multicore processing system according to an embodiment of the present invention will be described with reference to FIG. 1.

Figure 1:
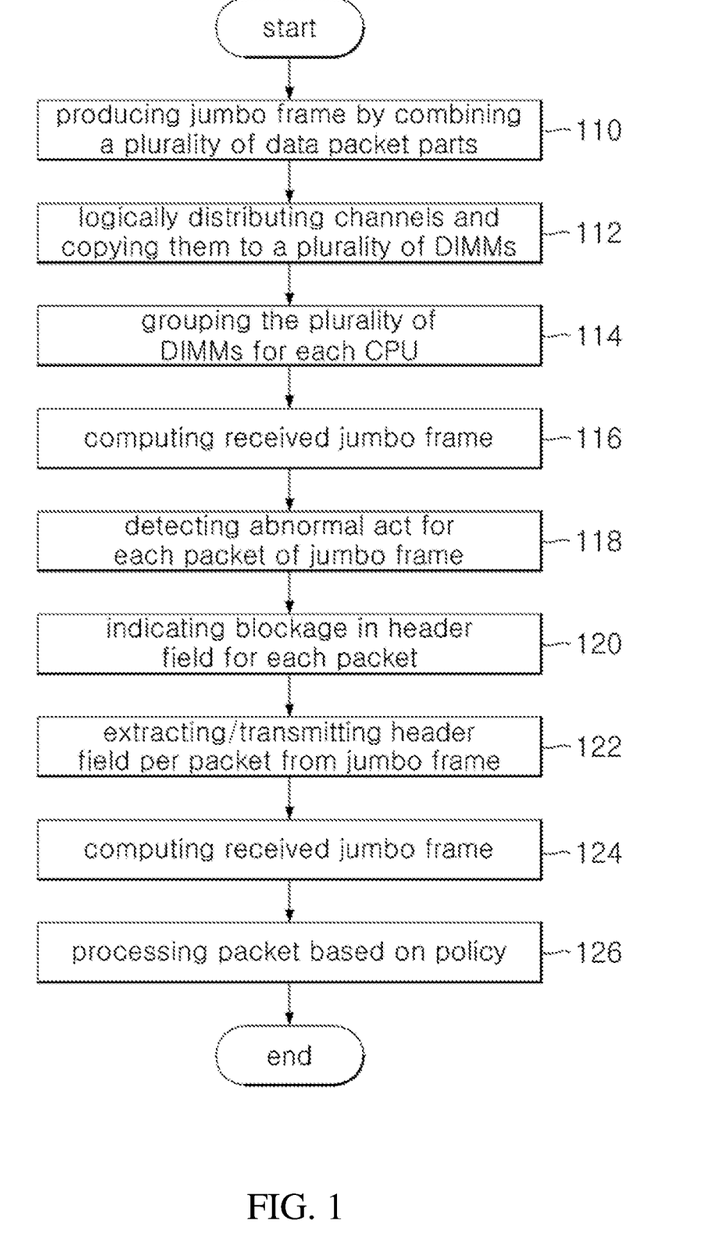
FIG. 1 is a flow chart of a method for service traffic security using DIMM channel distribution in a multicore processing system according to an embodiment of the present invention.

FIG. 1 is a flow chart of a method for service traffic security using DIMM channel distribution in a multicore processing system according to an embodiment of the present invention.

Referring to FIG. 1, in step 110, at a network interface card (NIC) controlling input and output of a data packet at a predetermined level based on a multicore platform, a plurality of data packet units received from a port are combined and a jumbo frame unit is produced based on resources assigned to the multicore processing system.

Here, the predetermined level refers to a rate of 100 gigabytes (GB), and by the operation in step 110, n packet units of a predetermined level received at 100 GB NIC are converted into a single jumbo frame unit having a size of 8 kilobytes (KB) maximum.

In the jumbo frame, a header field is further expanded and produced in front of the data packet for each of the plurality of data packets received from the port, through a field producing part further producing a field in the data packet and expanding the size of the data packet.

The jumbo frame according to an embodiment of the present invention is made for transmitting a large amount of data packets at once by expanding the size of general data packets of predetermined bytes (64, 128 byte . . . ) to 8 kilobytes (KB) due to an increase in GB network speed. When a plurality of data packets are received, the multicore processing system, to which the present invention is applied, assigns resources for producing a jumbo frame, and reduces the size of data packets to be transmitted due to header fields attached to each data packet, thereby saving resources and increasing the transmitting rate of the multicore processing system.

Here, the structure of the jumbo frame is described with reference to FIG. 3.

Figure 3:
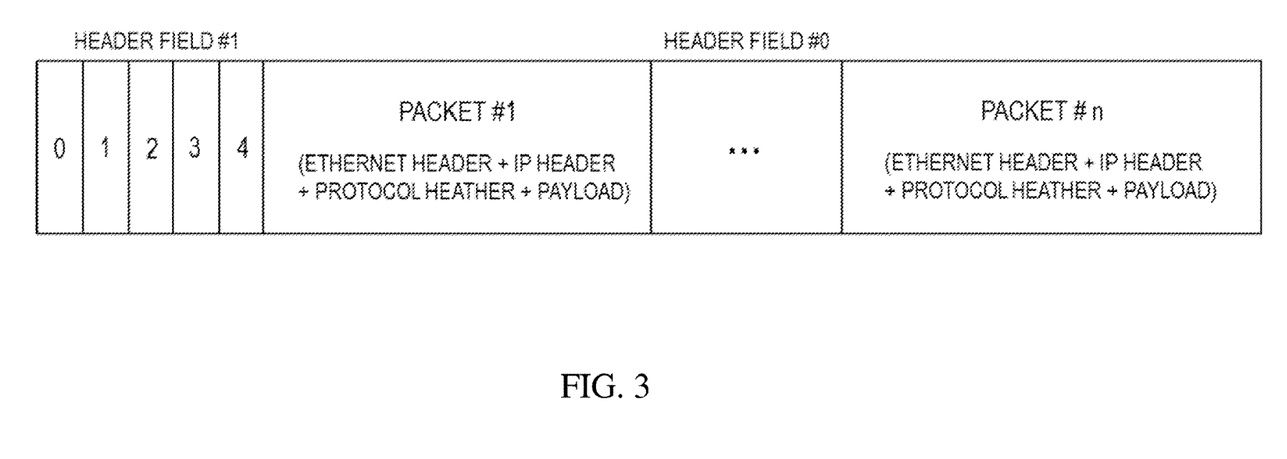
FIG. 3 is a schematic view of a jumbo frame to which a method for service traffic security using DIMM channel distribution in a multicore processing system according to an embodiment of the present invention is applied.

FIG. 3 is a schematic view of a jumbo frame, to which a method for service traffic security using DIMM channel distribution in a multicore processing system according to an embodiment of the present invention is applied. As illustrated in FIG. 3, the jumbo frame 310 includes a plurality of data packets 32 and 33, and a header field (header field #1 30, header field #n 33) classified by being counted (0, 1, 2, 3, 4) sequentially in front of a fixed header for each data packet is added to indicate information of the data packet corresponding to predefined items for decoding.

The plurality of data packets 32 and 33 may be stored as Ethernet headers, IP headers, protocol headers, and payload receiving packets.

Here, for decoding the corresponding packet, the header field is classified into 0: jumbo frame receive event, 1: location of the corresponding jumbo frame stored in a jumbo frame storage part, 2: packet length, 3: pattern matching ID renewed in a pattern matching processing part, and 4: policy item (1: pass, 0: block), to be added or removed from the jumbo frame according to the path transmitted or received from the NIC based on the operation to be described later.

Further, the jumbo frame is updated for each header field for each packet through the item No. 3 with regard to the pattern matching result for each packet included in the jumbo frame through the pattern matching based on a predetermined packet processing rule using a pattern matching processing part associated with the NIC, and is produced by recombining each data packet updated with the pattern matching result for each packet.

Next, in step 112, the produced jumbo frame unit is copied to a plurality of dual in-line memory modules (DIMMs) by logical channel distribution through a peripheral component interconnect (PCI) interface part.

Specifically, in the network interface card (NIC), which transmits and receives data packets in a medium access control manner from an external or internal network of the system to which the present invention is applied, a plurality of data packet units received from a port are combined to produce a jumbo frame, and the produced jumbo frame is temporarily stored in the jumbo frame unit and copied through a distribution processing part to dual in-line memories (DIMMs) at physically different locations, i.e., to the plurality of DIMMs located in a host system, by logical distribution to correspond to the plurality of DIMMs through the peripheral component interconnect (PCI) bus connecting the NIC and host system and the PCI interface part performing the interface.

In step 114, the plurality of DIMM channels are grouped for each CPU configured with a plurality of multicore processors in the host. In step 116, the jumbo frame received for each of the plurality of DIMM channels grouped is computed from each CPU.

In other words, according to the embodiment of the present invention, in steps 112 to 116, the jumbo frame is logically distributed through 16 DIMM selections maximum through each PCI interface part sequentially selected from the distribution processing part of the NIC.

Here, according to the operation of the distribution processing part of the NIC, the jumbo frame logically distributed through eight channels to correspond to the plurality of DIMMs is copied through a first PCI interface part in each PCI interface part, and the jumbo frame logically distributed through eight channels to correspond to another plurality of DIMMs is coped through a second PCI interface part. Thereafter, each of the plurality of DIMMs is grouped according to the number of CPUs of the host system. For example, according to the embodiment of the present invention, four CPUs are present in each host of in the multicore processing system, four channels from the DIMMs are grouped to each CPU, and the jumbo frame corresponding to each DIMM channel grouped for each CPU is transmitted to the corresponding CPU for computing.

The present invention is configured with a plurality of physical cores for each CPU for more effectively using system resources in data packet processing which requires a large amount of computation in multicore processor environments based on a multicore platform, and the plurality of multicore processors configured for each CPU are capable of exhibiting stronger performance, reducing power consumption, and efficiently processing multiple works at once.

Next, in step 118, an abnormal act for each packet included in the jumbo frame is detected through a security engine part checking a predetermined item of the computed jumbo frame and whether to block each packet is analyzed.

Through the operation in step 118, the security engine part checks the predetermined items of the jumbo frame according to the predetermined packet blockage rule by a detection rule policy, i.e., analyzing the field for each packet and the packet, to identify the information of a packet to be blocked based on the abnormal act.

The security engine part, which detects a pattern of malicious string mainly used for attacking a network for each packet through a policy based on an intrusion prevention system (IPS), is capable of performing M X four CPUs, M cores in CPU X four CPUs #0 to #3.

Each security engine part identifies a receive event from the header field for each packet in the jumbo frame in real time and checks various packets in the jumbo frame.

In step 120, the detection result, which is the analysis result of blockage for each packet, is indicated in the header field for each packet. For example, whether to pass or block the corresponding packet is set as 1 or 0 and indicated in the policy item No. 4 in the header field.

In step 122, the header field for each packet in the jumbo frame is extracted and the analysis result indicated based on the predetermined policy is transmitted to the NIC through the PCI interface part. In step 124, the blockage corresponding to the analysis result received from the header field is identified. Here, the security engine part indicates the processed analysis result using the policy item No. 4 of the header field, and the policy item No. 4 is used for setting 0 for the case of blocking the corresponding packet and 1 for the case of passing the packet.

The packet is processed according to the analysis result through the operation of step 126.

Specifically, the information of the header field for each packet received from the host through the PCI interface part is checked, the jumbo frame including the packet determined as a normal packet is retrieved in the jumbo frames prestored in the NIC, and the normal packet is extracted from the retrieved jumbo frame and separated into a packet unit to be transmitted.

The operation of step 126 is for separating packets determined as normal packets into packet unit again from the jumbo frame including the data packets determined as normal packets for compatibility with an external network in the case of transmitting the used jumbo frame outside again for saving resources and increasing a transmission rate inside the multicore processing system, obtained by combining multiple data packets into one jumbo frame, thereby reducing the size of data to be transmitted due to a header field added and expanded for each data packet.

In the above, the method for service traffic security using DIMM channel distribution in a multicore processing system according to an embodiment of the present invention is described with reference to FIG. 1 and FIG. 3.

Hereinafter, an apparatus for service traffic security using DIMM channel distribution in a multicore processing system according to an embodiment of the present invention is described.

Figure 2:
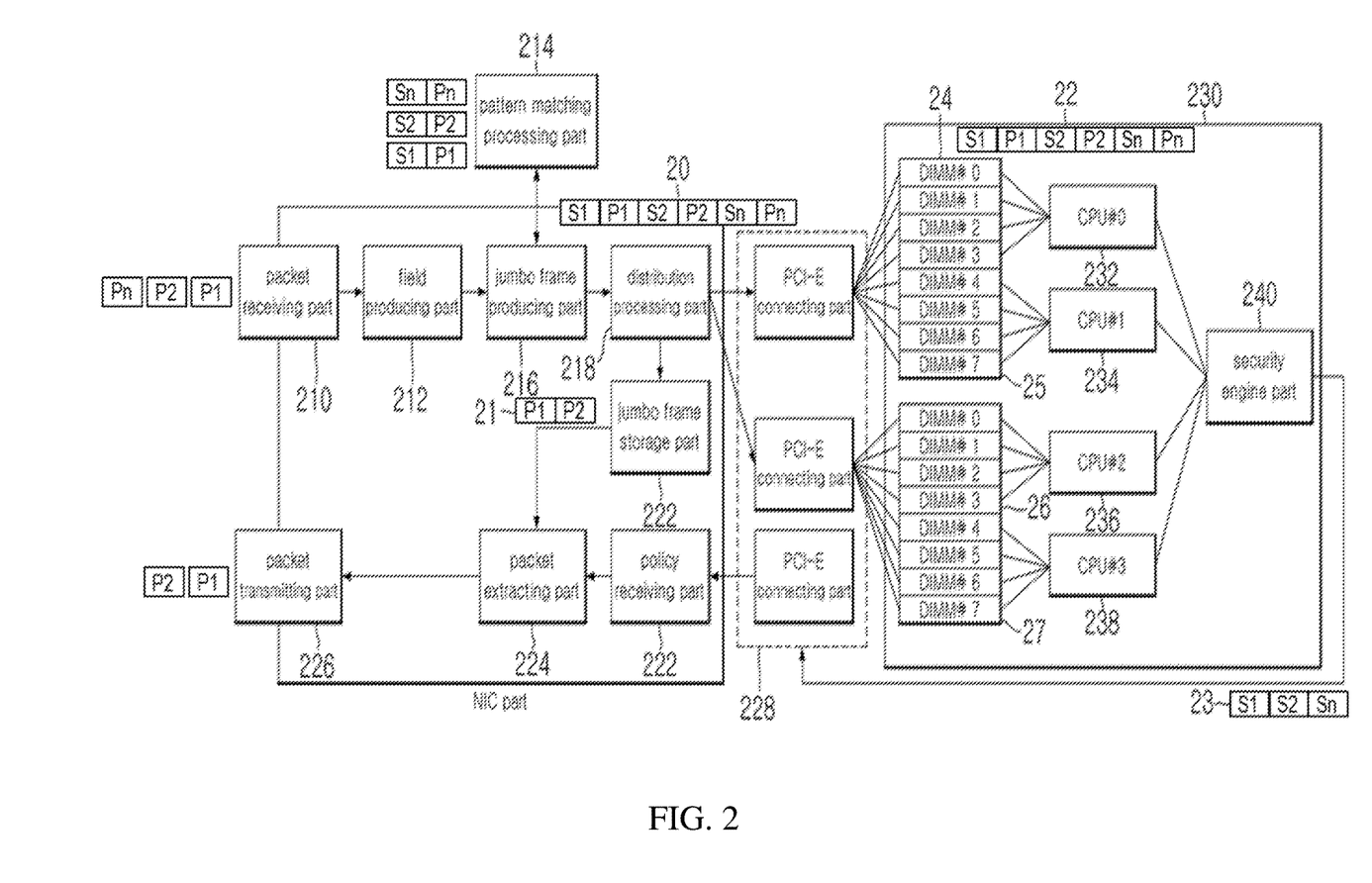
FIG. 2 is a block diagram of an apparatus for service traffic security using DIMM channel distribution in a multicore processing system according to an embodiment of the present invention.

FIG. 2 is a block diagram of an apparatus for service traffic security using DIMM channel distribution in a multicore processing system according to an embodiment of the present invention.

Referring to FIG. 2, the apparatus 200 for service traffic security using DIMM channel distribution in a multicore processing system according to the present invention includes a network interface card (NIC) part 205, PCI interface parts 228 and 229, and a host 230.

The NIC part 205, which includes a packet receiving part 210, a field producing part 212, a pattern matching processing part 214, a jumbo frame producing part 216, a distribution processing part 218, a jumbo frame storage part 220, a policy receiving part 222, a packet extracting part 224, and a packet transmitting part 226, controls input and output of the data packet at a predetermined level under a multicore platform, produces a jumbo frame unit based on assigned resources by combining a plurality of data packet units received from a port, and copies the produced jumbo frame to a plurality of dual-in line memory modules (DIMMs) in the host 230 by logical channel distribution through the peripheral component interconnect (PCI) interface part 228.

The configuration of NIC part 205 is described in detail.

The packet receiving part 210, which receives traffic input, receives data packets (P1, P2 . . . Pn) at a predetermined level (100 giga) under a multicore platform.

The field producing part 212, which expands to information including data packet information and pattern matching result, expands the size of the data packet by further producing a field in the data packet received from the packet receiving part 210. The field producing part 212 expands a header field capable of storing packet length, storage location, pattern matching ID information, etc. in front of each data packet, to produce S1P1, S2P2, SnPn.

Here, the header field is classified into jumbo frame receive event, location of the jumbo frame stored in the jumbo frame storage part, packet length, pattern matching ID renewed in the pattern matching processing part 214, and policy item, for decoding the corresponding packet, and added or removed from the jumbo frame according to the path transmitted or received from the NIC part.

The jumbo frame producing part 216 converts n header fields and data packets into one jumbo frame of 8 kilobytes maximum.

The jumbo frame producing part 216 combines the data packets in which the field is added from the field producing part 212 into one jumbo frame packet 20, and produces a jumbo frame unit in which a plurality of data packets indicating the information of data packets corresponding to each predefined item which is information for decoding in the header field sequentially counted and classified in front of a fixed header for each data packet are combined.

The pattern matching processing part 214 is for renewing the pattern matching result in each header field. The NIC part 205 in the multicore processing system to which the present invention is applied is updated with the pattern matching result for each packet included in the jumbo frame through the pattern matching based on a predetermined packet processing rule, using the pattern matching processing part 214 associated with the jumbo frame, and recombines each data packet updated with the pattern matching result for each packet and produces it.

According to the apparatus for service traffic security using DIMM channel distribution in a multicore processing system according to an embodiment of the present invention, when one jumbo frame packet is transmitted to the external pattern matching processing part 214 in order to minimize the computation for each CPU in the host 230, the external pattern matching processing part 214 renews the pattern matching result in S1, S2, Sn header fields and transmits S1P1S2P2SnPn packets 20 to the jumbo frame producing part 216 again.

The distribution processing part 218 distributes the jumbo frame into a plurality of dual in-line memory modules (DIMMs) 24, 25, 26, and 27 at physically different locations through the peripheral component interconnect (PCI) interface part 228.

Specifically, the distribution processing part 218 according to an embodiment of the present invention distributedly transmits the jumbo frame packet to multiple DIMMs 24, 25, 26, and 27 at physically different locations through a PCI-E connecting part 228. The distribution processing part 218 includes two PCI-E connecting parts 228, for processing a 100 giga rate, since the processing performance of eight lanes based on a PCIE 3 standard is capable of providing only a rate of 64 giga. Further, the distribution processing part 218 sequentially selects two PCIE connecting parts 228, and stores the selection of 16 DIMMs maximum at DIMM locations obtained by (a hash value) % (DIMM/the number of PCIE connecting parts) extracted from the jumbo frame, through an algorism, for example, selected by distributing into a plurality of DIMMs 24, 25, 26, and 27, or distributes into DIMM0, DIMM#1. . . DIMM#7, DIMM#0. . . sequentially through a round robin algorithm.

The jumbo frame storage part 220 temporarily stores the jumbo frame produced from the jumbo frame producing part 216.

The policy receiving part 222 receives the information of packets blocked based on the abnormal act of the packets from the host.

The packet extracting part 224 retrieves the jumbo frames stored in the jumbo frame storage part 220 and extracts normal packets from the corresponding jumbo frame. The packet extracting part retrieves a jumbo frame including the packet determined as a normal packet from the jumbo frames prestored in the NIC part 205, by checking the information of the header field for each packet received through the PCI interface part 229, extracts the normal packet from the retrieved jumbo frame and separates it into a packet unit, and transmits it to the packet transmitting part 226.

Next, the host 230 illustrated in FIG. 2 groups channels from a plurality of DIMMs 24, 25, 26, and 27 for each CPU 232, 234, 236, and 238 including a plurality of multicore processors, controls the jumbo frame received at each of the plurality of DIMMs 24, 25, 26, and 27 channels grouped to be computed from each CPU 232, 234, 236, and 238, checks predetermined items (field and packet) of the computed jumbo frame and analyzes whether to block the packet corresponding to the jumbo frame through the security engine part 240 detecting an abnormal act, indicates the analysis result in a header field of each packet, extracts the header field for each packet of the jumbo frame, and transmits the analysis result indicated based on a predetermined policy to the NIC part 205 through the PCI interface part 229.

Here, the security engine part 240 is capable of performing M X four CPUs, M cores in CPUs 232, 234, 236, and 238 X four CPUs #0 to #3. Each security engine part identifies a receive event of the jumbo frame in real time and checks various packets in the jumbo frame.

The result is transmitted to the policy receiving part 222 of the NIC part 205 by storing the result of 1, 1, 0 as No. 4 in S1, S2, Sn 23. The NIC part 205 is transmitted with as much as the size of the jumbo frame packet, but only the header field has to be transmitted from the host 230 to the NIC part 205, which allows packet processing only with a small amount of data. The packet extracting part 224 extracts only PASS packets from the jumbo frame storage part 220 stored in the NIC part 205 by receiving the result at the policy receiving part 222, and separates the jumbo frame into a packet unit and transmit it to the packet transmitting part 226.

As described above, the operation can be performed, related to a method and apparatus for service traffic security using DIMM channel distribution in the multicore processing system according to the present invention. Specific embodiments are described in the above description of the present invention. However, it should be construed that various modifications can be carried out without departing from the scope of the present invention. Therefore, the scope of the present invention is not defined by embodiments described above, but should be defined by the claims and equivalents to the claims.

| Explanation on reference numerals | |
|---|---|
| 210: packet receiving part | 212: field producing part |
| 214: pattern matching processing part | 216: jumbo frame producing part |
| 218: distribution processing part | 210: jumbo frame storage part |
| 222: policy receiving part | 224: packet extracting part |
| 226: packet transmitting part | |

What is claimed is:

1. A method for service traffic security using DIMM channel distribution in a multicore processing system, the method comprising:
producing a jumbo frame unit based on assigned resources by combining a plurality of data packet units received from a port at a network interface card (NIC) controlling input and output of a data packet at a predetermined level based on a multicore platform;
copying the produced jumbo frame unit to a plurality of dual in-line memory modules (DIMMs) by logical channel distribution through a peripheral component interconnect (PCI) interface part;
grouping a plurality of DIMM channels for each CPU including a plurality of multicore processors in a host, and computing the jumbo frame received at each of the plurality of DIMM channels grouped from each CPU;
checking predetermined items of the computed jumbo frame and analyzing whether to block a packet corresponding to the jumbo frame through a security engine part detecting an abnormal act, to indicate the analysis result in a header field of each packet; and
extracting the corresponding header field for each packet of the jumbo frame and transferring the analysis result indicated based on a predetermined policy to the NIC through the PCI interface part, to process the packet based on the analysis result.

2. The method of claim 1, wherein the jumbo frame includes a plurality of data packets, and adds a header field counted and classified sequentially in front of a fixed header for each data packet, to indicate information of a data packet corresponding to a predefined item.

3. The method of claim 2, wherein the header field is added or removed from the jumbo frame according to a jumbo frame receive event, a location of the jumbo frame stored in a jumbo frame storage part, a packet length, a pattern matching ID renewed at a pattern matching processing part, and a path transmitted or received from the NIC classified as a policy item, for performing decoding of the corresponding packet.

4. The method of claim 1, wherein the processing of the packet according to the analysis result includes checking information of the header field for each packet received from the PCI interface part, retrieving a jumbo frame including the packet determined as a normal packet among jumbo frames prestored in the NIC, extracting the normal packet from the retrieved jumbo frame, and separating it into a packet unit, to be transmitted.

5. The method of claim 1, further comprising expanding a header field in front of the data packet for each of the plurality of data packets received from the port, through a field producing part further producing a field in the data packet and expanding the size of the data packet.

6. The method of claim 1, wherein the jumbo frame is updated with a pattern matching result included in the jumbo frame for the header field for each packet, through the pattern matching based on a predetermined packet processing rule, using an associated pattern matching processing part, and is produced by recombining each data packet updated with the pattern matching result for each packet.

7. An apparatus for service traffic security using DIMM channel distribution in a multicore processing system, the apparatus comprising:
a network interface card (NIC) part controlling input and output of a data packet at a predetermined level based on a multicore platform, producing a jumbo frame unit based on assigned resources by combining a plurality of data packet units received from a port, and copying the produced jumbo frame unit to a plurality of dual in-line memory modules (DIMMs) in a host by logical channel distribution through a peripheral component interconnect (PCI) interface part; and
a host grouping a plurality of DIMM channels for each CPU including a plurality of multicore processors, controlling the jumbo frame received at each of the plurality of DIMM channels grouped to be computed from each CPU, checking predetermined items of the computed jumbo frame and analyzing whether to block a packet corresponding to the jumbo frame through a security engine part detecting an abnormal act, indicating the analysis result in a header field of each packet, extracting the header field for each packet of the jumbo frame, and transferring the analysis result indicated based on a predetermined policy to the NIC part through the PCI interface part.

8. The apparatus of claim 7, wherein the NIC part comprises:
a packet receiving part receiving a data packet at a predetermined level under a multicore platform;
a field producing part further producing a header field in the data packet received by the packing receiving unit and expanding the size of the data packet;
a jumbo frame producing part combining the data packet with the further field produced by the field producing part and producing a jumbo frame unit combining a plurality of data packets indicating information of the data packet corresponding to a predefined item in a header field counted and classified sequentially in front of a fixed header for each data packet;
a distribution processing part distributing the jumbo frame to a plurality of dual in-line memory modules (DIMMs) at physically different locations, through the PCI interface part;
a jumbo frame storage part temporarily storing the jumbo frame produced from the jumbo frame producing part;
a policy receiving part receiving from the host information of a packet blocked based on an abnormal act; and
a packet extracting part retrieving jumbo frames stored in the jumbo frame storage part and extracting a normal packet from the jumbo frame.

9. The apparatus of claim 7, wherein the header field is added or removed from the jumbo frame according to a jumbo frame receive event, a location of the jumbo frame stored in a jumbo frame storage part, a packet length, a pattern matching ID renewed at a pattern matching processing part, and a path transmitted or received from the NIC part classified as a policy item, for performing decoding of the corresponding packet.

10. The apparatus of claim 8, wherein the packet extracting part checks information of the header field for each packet received from the PCI interface part, retrieves a jumbo frame including the packet determined as a normal packet among jumbo frames prestored in the NIC, extracting the normal packet from the retrieved jumbo frame, and separating it into a packet unit, to be transmitted.

* * * * *